United States Patent
Lee et al.

(10) Patent No.: US 8,861,518 B2
(45) Date of Patent: Oct. 14, 2014

(54) CONTENTS SUPPLY SYSTEM, A METHOD, A SERVICE SERVER, A STORAGE MEANS, A RELAY METHOD, AN APPLICATION SERVER AND A CELLULAR PHONE FOR MULTI CONNECTED END TERMINAL

(75) Inventors: Jeong Hoon Lee, Seoul (KR); Jeong Min You, Seoul (KR); In Hwan Kim, Seoul (KR); Sung Mu Son, Seoul (KR)

(73) Assignee: SK Planet Co., Ltd., Seoul (KR)

( * ) Notice: Subject to any disclaimer, the term of this patent is extended or adjusted under 35 U.S.C. 154(b) by 1145 days.

(21) Appl. No.: 12/809,402

(22) PCT Filed: Dec. 4, 2008

(86) PCT No.: PCT/KR2008/007153
§ 371 (c)(1),
(2), (4) Date: Jun. 18, 2010

(87) PCT Pub. No.: WO2010/050640
PCT Pub. Date: May 6, 2010

(65) Prior Publication Data
US 2011/0149931 A1   Jun. 23, 2011

(30) Foreign Application Priority Data
Oct. 28, 2008   (KR) .................. 10-2008-0105765

(51) Int. Cl.
H04L 12/28 (2006.01)
H04L 12/56 (2006.01)
H04L 29/06 (2006.01)
H04L 9/32 (2006.01)
H04L 29/08 (2006.01)

(52) U.S. Cl.
CPC ............ *H04L 63/08* (2013.01); *H04L 9/321* (2013.01); *H04L 29/08621* (2013.01); *H04L 67/146* (2013.01)
USPC ........................................... 370/389

(58) Field of Classification Search
None
See application file for complete search history.

(56) References Cited

U.S. PATENT DOCUMENTS

| 7,450,854 | B2 | 11/2008 | Lee et al. | |
|---|---|---|---|---|
| 2001/0056578 | A1* | 12/2001 | Hwang et al. | 725/98 |
| 2003/0050062 | A1* | 3/2003 | Chen et al. | 455/435 |

FOREIGN PATENT DOCUMENTS

| CN | 1420659 | 5/2003 |
|---|---|---|
| CN | 1822561 | 8/2006 |

(Continued)

OTHER PUBLICATIONS

K. Leung, G. Dommety, V. Narayanan A. Petrescu, RFC 5177: Network Mobility (NEMO) Extensions for Mobile IPv4, Apr. 2008, pp. 1-26.*

(Continued)

*Primary Examiner* — John Blanton
*Assistant Examiner* — Christopher Crutchfield
(74) *Attorney, Agent, or Firm* — Lowe Hauptman & Ham, LLP.

(57) ABSTRACT

Disclosed herein are a system and method for providing content to a plurality of end terminals, a service server, a content relay method, an application server, a content provision method, and a mobile communication terminal. The system includes a plurality of end terminals connected to a mobile communication terminal via a Local Area Network (LAN), and configured to execute content received from an application server, a mobile communication terminal connected to a service server via a mobile communication network, and configured to transfer content between the end terminals and the-service server, the service server connected to the application server, and configured to authenticate the end terminals and the mobile communication terminal and to request content, requested by authenticated end terminals, from the application server, and the terminal application server for providing the content, requested by the end terminals, to the service server.

14 Claims, 6 Drawing Sheets

(56) References Cited

FOREIGN PATENT DOCUMENTS

| | | |
|---|---|---|
| EP | 1533948 | 8/2002 |
| JP | 2001-251341 | 9/2001 |
| JP | 2007-282255 | 10/2007 |
| KR | 10-2006-0059599 | 6/2006 |
| KR | 10-2007-0042045 | 4/2007 |
| KR | 10-2008-0008755 | 1/2008 |
| WO | 2004100465 | 11/2004 |
| WO | 2006098037 | 9/2006 |
| WO | 2007091699 | 8/2007 |

OTHER PUBLICATIONS

First Office Action by SIPO for 200880119421.9 on Sep. 19, 2012, citing the above references.

Office Action for Japanese Patent Application No. 2011-534360 mailed on Aug. 3, 2012, citing the above references.

International Search Report mailed May 28, 2009, for PCT/KR2008/007153, citing the above references.

* cited by examiner

CONTENTS SUPPLY SYSTEM, A METHOD, A SERVICE SERVER, A STORAGE MEANS, A RELAY METHOD, AN APPLICATION SERVER AND A CELLULAR PHONE FOR MULTI CONNECTED END TERMINAL

CROSS-REFERENCE TO RELATED APPLICATION

This application claims the priority of Korean Patent Application No. 10-2008-0105765, filed on Oct. 28, 2008 in the KIPO (Korean Intellectual Property Office), the disclosure of which is incorporated herein in their entirety by reference. Further, this application is the National Phase application of International Application No. PCT/KR2008/007153, filed Dec. 4, 2008, which designates the United States and was published in English. Each of these applications is hereby incorporated by reference in their entirety into the present application.

TECHNICAL FIELD

The present invention relates, in general, to a system and method for providing content to a plurality of end terminals, a service server, a content relay method, an application server, a content provision method, and a mobile communication terminal, and, more particularly, to a technology for providing content, requested by a plurality of end terminals, simultaneously to the respective end terminals when the end terminals are interconnected via a Local Area Network (LAN).

BACKGROUND ART

With the development of information and communication technology, a variety of end terminals capable of playing back documents, images, motion pictures, etc., such as MPEG Audio Layer 3 (MP3) players, Personal Multimedia Players (PMPs), and Ultra-Mobile Personal Computers (UMPCs), have been used. The end terminals enable users to download desired content from Personal Computers (PCs) and play the downloaded content. However, the end terminals have a problem in that users cannot download desired content onto the end terminals when they are moving or the end terminals cannot be connected with a PC.

In order to overcome this problem, there was proposed a technology for adding communication means capable of accessing LANs, such as Bluetooth or UltraWideBand (UWB), to the end terminals. According to the technology, it is possible to download content from external devices over LANs. Although this method enables content, stored in external devices, to be downloaded, it is problematic in that content that is desired by a user but is not stored in an external device cannot be downloaded.

In order to overcome the problem, there was proposed a technology for enabling an end terminal and a mobile communication terminal to be connected to each other and enabling the mobile communication terminal to receive and transfer content requested by the end terminal. However, this technology has a problem in that it cannot simultaneously deal with content provision requests made by a plurality of end terminals.

DISCLOSURE OF INVENTION

Technical Problem

Accordingly, the present invention has been made keeping in mind the above problems occurring in the prior art, and an object of the present invention is to provide a technology for enabling a plurality of end terminals capable of accessing LANs to download and execute content desired by users over a mobile communication network.

Technical Solution

In order to accomplish the above object, one embodiment of the present invention provides a system for providing content to a plurality of end terminals, the system including the plurality of end terminals connected to a mobile communication terminal via a Local Area Network (LAN), and configured to execute content received from an application server; a mobile communication terminal connected to a service server via a mobile communication network, and configured to transfer content between the end terminals and the service server; the service server connected to the application server via the mobile communication network or a wired communication network, and configured to authenticate the end terminals and the mobile communication terminal and to request content, requested by authenticated end terminals, from the application server; and the application server for providing the content, requested by the end terminals, to the service server.

In this embodiment, the system may further include a billing server connected to the service server via the mobile communication network or the wired communication network, and configured to charge the mobile communication terminal in the case where content is provided by the application server to the end terminals.

In order to accomplish the above object, another embodiment of the present invention provides a content provision method using a system in which end terminals and a mobile communication terminal are interconnected via a LAN and the mobile communication terminal, a service server and an application server are interconnected via a mobile communication network, the content provision method including an authentication step of the service server authenticating the end terminals and the mobile communication terminal; a content request step of each of the end terminals selecting content from a list provided by the service server and requesting the service server to transmit the selected content and a provision step of the application server providing the content, requested by the end terminal, to the end terminal.

In this embodiment, the content provision method may further include a service request step of each of the end terminals searching for a mobile communication terminal and transmitting a service request signal to the located mobile communication terminal.

In this embodiment, the authentication step may include a first authentication step of the mobile communication terminal determining whether each of the end terminals is a serviceable device a second authentication step of, if, as a result of the determination at the first authentication step, the end terminal is determined to be a serviceable device, the end terminal transmitting unique ID information thereof to the mobile communication terminal; a third authentication step of the mobile communication terminal determining whether the unique ID information of the end terminal is normal a fourth authentication step of, if, as a result of the determination at the third authentication step, the unique ID information is determined to be normal, the mobile communication terminal transmitting unique ID information of the mobile communication terminal and the end terminal to the service server; a fifth authentication step of the service server determining serviceability of the mobile communication terminal and the end terminal based on unique ID information and subscription information of the mobile communication terminal and the end terminal and a sixth authentication step of, if, as a result of the determination at the fifth authentication step, the mobile communication terminal and the end terminal are determined to have serviceability, transmitting an authentication message to the end terminal.

In this embodiment, the content request step may include a first content request step of each of the end terminals transmitting information about a connected LAN and a list request message to the service server; a second content request step of the service server transmitting the requested list to the end terminal a third content request step of the service server transmitting content information, included in the requested list, to the end terminal and a fourth content request step of the end terminal selecting content information, included in the list, and transmitting the selected content information to the service server.

In this embodiment, the content information of the third content request step may include a content description, a type of LAN through which the content information can be transmitted, billing information, a size of the content, and a codec and transmission format of the content.

In this embodiment, the fourth content request step may further include a step of the end terminal transmitting billing information to a billing server.

In this embodiment, the provision step may include a first provision step of the service server determining whether conversion of the selected content is required; a second provision step of, if as a result of the determination at the first provision step, conversion is determined to be required, the service server requesting the application server to convert the selected content or the service server directly converting the content; and a third provision step of the service server transmitting the converted content to the end terminal.

In order to accomplish the above object, still another embodiment of the present invention provides a service server for relaying content to a plurality of end terminals, the service server including a communication unit for transmitting and receiving data over a mobile communication network; a mobile communication terminal management unit for managing mobile communication terminal information received through the communication unit an end terminal management unit for managing end terminal information received through the communication unit; a LAN management unit for managing information about a LAN between the mobile communication terminal and the end terminals; a storage unit for storing the mobile communication terminal information, the end terminal information, and the LAN information; and a control unit for authenticating the mobile communication terminal and the end terminals based on the mobile communication terminal information and the end terminal information and controlling content, received from the communication unit, so that it will be transferred to the mobile communication terminal.

In order to accomplish the above object, still another embodiment of the present invention provides a method of relaying content to respective end terminals using a service server, the method including an authentication step of authenticating a mobile communication terminal and the respective end terminals; a list provision step of providing a content list to the mobile communication terminal; a content information provision step of providing content information to the mobile communication terminal; and a content transfer step of receiving content, requested by the mobile communication terminal, from an application server and transmitting the received content to the mobile communication terminal.

In this embodiment, the content transfer step may include the service server-transferring a content conversion request based on a hardware specification of the mobile communication terminal or each of the respective end terminals to the service server or directly converting the content, and transferring content, converted in the application server or directly converted by the service server, to the mobile communication terminal.

In order to accomplish the above object, still another embodiment of the present invention provides a storage medium storing the method of relaying content to a plurality of end terminals using a service server in program form.

In order to accomplish the above object, still another embodiment of the present invention provides an application server, including a communication unit for transmitting and receiving data over a mobile communication network; a content management unit for managing content; a storage unit for storing content; and a control unit for controlling the communication unit so that it provides content information and content to a service server.

In this embodiment, the application server may further include a conversion unit for converting content according to a content conversion command received from the control unit.

In order to accomplish the above object, still another embodiment of the present invention provides a content provision method using an application server, including an information provision step of providing content information to a service server; and a content provision step of providing content requested by the service server.

In this embodiment, the content provision method may further include a content conversion step of converting the content at the request of the service server.

In order to accomplish the above object, still another embodiment of the present invention provides a storage medium storing the content provision method using an application server in the form of a program.

In order to accomplish the above object, still another embodiment of the present invention provides a mobile communication terminal for relaying content, including a first communication unit for transmitting and receiving data over a mobile communication network; a second communication unit for transmitting and receiving data over a LAN; an end terminal management unit for managing respective pieces of end terminal information received through the second communication unit; a storage unit for storing the end terminal information; and a control unit for checking serviceability of the end terminals and normality of unique ID information of the end terminals, and controlling the first communication unit and the second communication unit so that content requests made by the end terminals are transferred to a service server and content received from the service server is transferred to the end terminals.

In order to accomplish the above object, still another embodiment of the present invention provides a method of relaying content to respective end terminals through a mobile communication terminal, the method including an authentication step of authenticating the respective end terminals a list request transfer step of transferring content list requests of the respective end terminals to a service server; a content information transfer step of transferring content lists, received from the service server, to the respective end terminals; and a content transfer step of transferring respective pieces of content, received from the service server, to the respective end terminals.

In this embodiment, the method may further include an execution step of storing and executing the respective pieces of content received from the service server.

In order to accomplish the above object, still another embodiment of the present invention provides a storage medium storing the method of relaying content to a plurality of end terminals through a mobile communication terminal in the form of a program.

Advantageous Effects

According to the present invention, there is provided a technology for enabling a plurality of end terminals to simultaneously download desired content from an application server connected to a mobile communication network and execute the downloaded content using a mobile communication terminal found via a LAN.

DESCRIPTION OF REFERENCE NUMERALS OF PRINCIPAL ELEMENTS IN THE DRAWINGS

Figure 1:
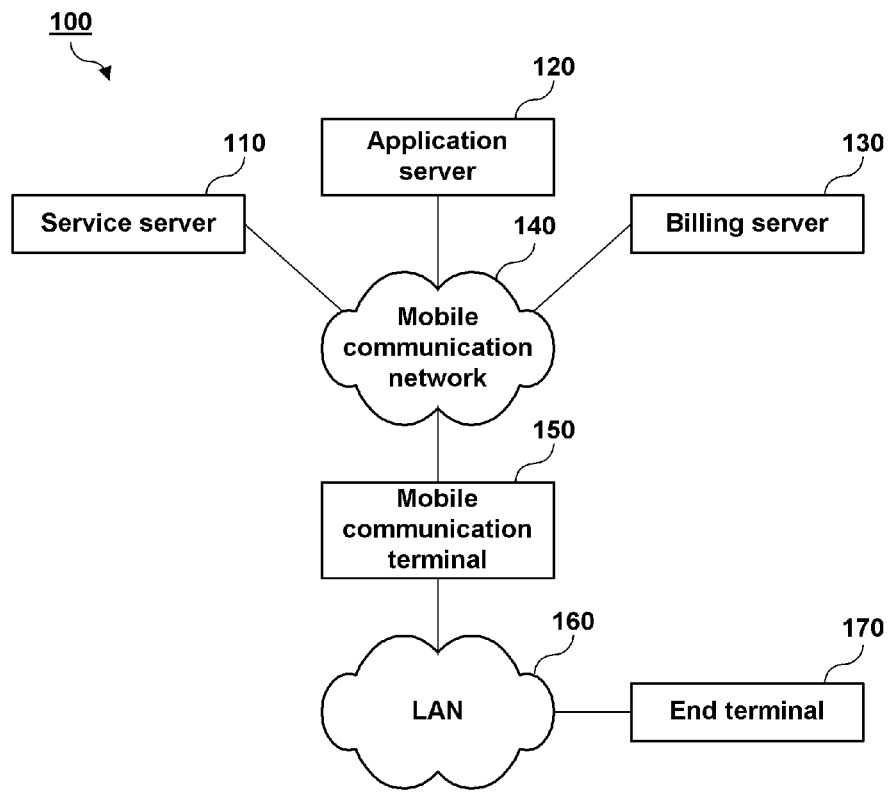
FIG. 1 is a block diagram of a content provision system according to an embodiment of the present invention.

100: content provision system 110: service server
120: application server 130: billing server
140: mobile communication network
150: mobile communication terminal
160: LAN
170: end terminal

MODE FOR THE INVENTION

Embodiments of the present invention will be described in detail with reference to the accompanying drawings.

In the following description of the present invention, if detailed descriptions of related known functions or constructions are determined to render the gist of the present invention unnecessarily vague, the detailed descriptions will be omitted. Furthermore, terms that will be described later are terms that are employed in consideration of the functions in the present invention, but the meanings thereof may be changed depending on a manufacturer's intention or the usual practice. Therefore, the terms should be defined in light of the entire content of the specification of the present invention.

A content provision system for a plurality of end terminals according to an embodiment of the present invention is described with reference to FIG. 1.

FIG. 1 is a block diagram of a content provision system according to an embodiment of the present invention.

As shown in FIG. 1, in the content provision system 100 for a plurality of end terminals according to the present embodiment, a service server 110, an application server 120, a billing server 130, and a mobile communication terminal 150 are interconnected via a mobile communication network 140, and a mobile communication terminal 150 is connected to end terminals 170 and 179 via a LAN 160.

Figure 5:
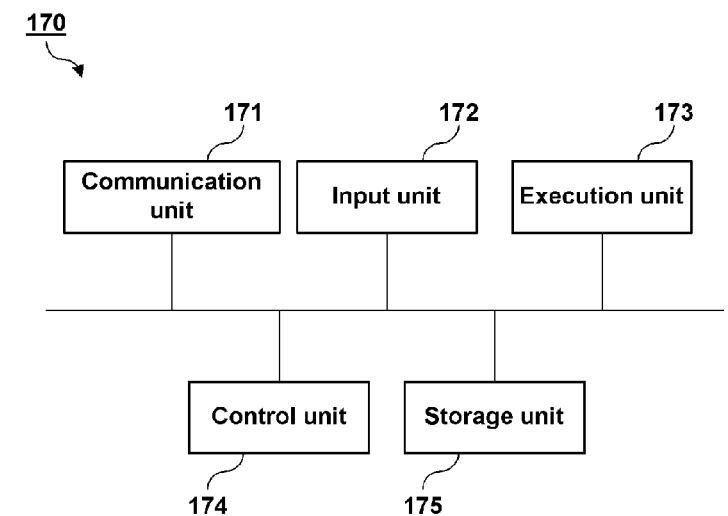
FIG. 5 is a detailed block diagram of the end terminal shown in FIG. 1.

The end terminals 170 and 179 are connected to the mobile communication terminal 150 via the LAN 160, and function to request content from the application server 120 and execute content received therefrom. A WLAN, Bluetooth, UWB or the like may be used as the LAN 160. The construction of the end terminal 170 is described in detail with reference to FIG. 5. A communication unit 171 transmits or receives data over the LAN. An input unit 172 receives commands from a user. Input means, such as an infrared remote controller, a switch, a keypad, a keyboard or a touch screen, may be used as the input unit 172. An execution unit 173 executes content received through the communication unit 171. The execution unit 173 may include a data processing unit and a sound processing unit so as to execute content. A control unit 174 controls the operation of the respective elements, and controls the communication unit 171 so that it transmits a content request signal to the mobile communication terminal and receives content from the mobile communication terminal. A storage unit 175 stores the ID information of an end terminal and received content.

The mobile communication terminal 150 is connected to the respective end terminals 170 and 179 via the LAN 160, and is connected to the service server 110 via the mobile communication network 140. The mobile communication terminal 150 is responsible for data transfer between the respective end terminals 170 and 179 and the service server 110. That is, the mobile communication terminal 150 is responsible for simultaneous data transfer to a plurality of end terminals (for example, respective terminals for performing various functions, such as navigation terminals and content playback terminals) that are connected via the LAN 160. To this end, the mobile communication terminal 150 includes a communication unit for communicating with the LAN 160 as well as a communication unit for communicating with the mobile communication network 140.

The service server 110 is connected to the mobile communication terminal 150 and the application server 120 via the mobile communication network 140. The service server 110 performs authentication for the end terminals 170 and 179 and the mobile communication terminal 150, and requests the application server 120 to provide content requested by the authenticated end terminals 170 and 179.

The application server 120 is connected to the service server 110 via the mobile communication network 140, and provides content requested by the end terminals 170 and 179.

The billing server 130 is connected to the service server 110 via the mobile communication network 140. In the case where content has been provided by the application server 120 to the end terminals 170 and 179, the billing server 130 charges the mobile communication terminal 150 for the content. Meanwhile, it should be noted that the billing server 130 can also charge the end terminals 170 and 179 for the content.

Meanwhile, it should be noted that the service server 110, the application server 120 and the billing server 130 may also be interconnected via a wired communication network (not shown), other than the mobile communication network 140. It should also be noted that the application server 120 and the billing server 130 may also be included in the service server 110 as elements thereof.

A content provision method for a plurality of end terminals according to an embodiment of the present invention is described with reference to FIGS. 6 to 10.

Figure 6:
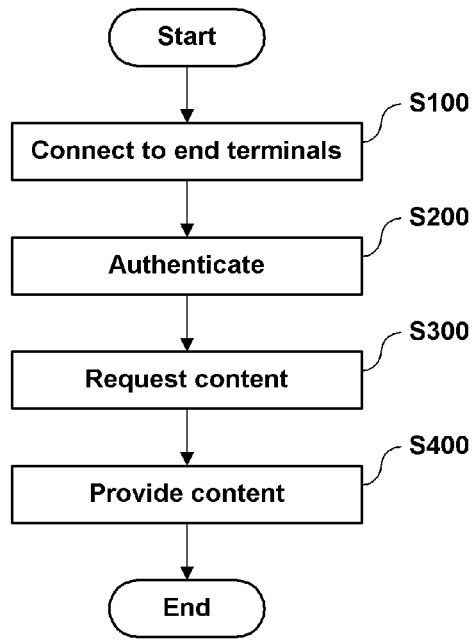
FIG. 6 is a flowchart of a content provision method according to an embodiment of the present invention.
Figure 7:
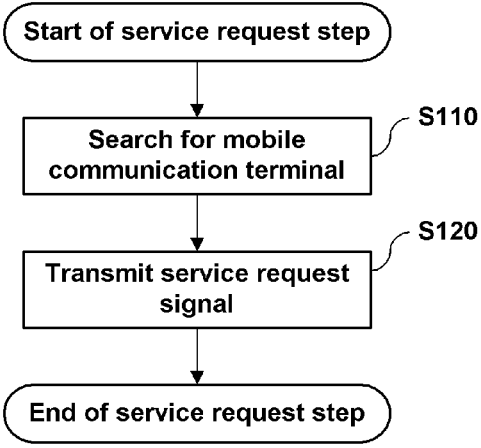
FIG. 7 is a detailed flowchart of the service request step shown in FIG. 6.
Figure 8:
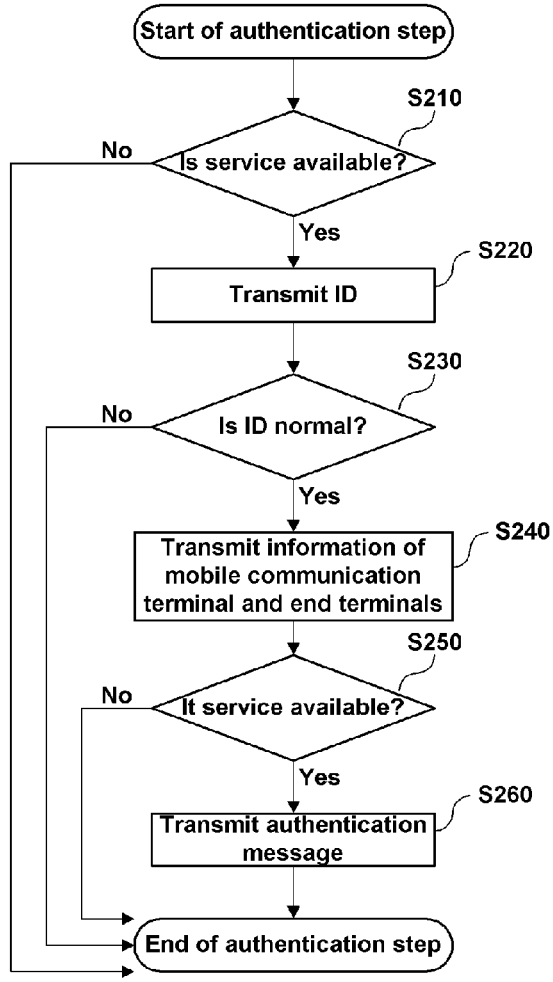
FIG. 8 is a detailed flowchart of the authentication step shown in FIG. 6.
Figure 9:
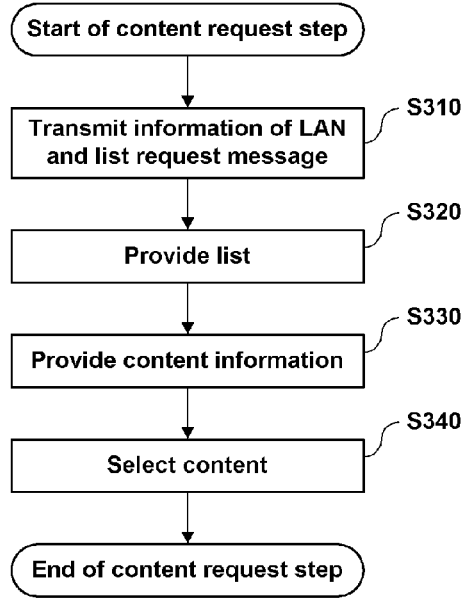
FIG. 9 is a detailed flowchart of the content request step shown in FIG. 6.
Figure 10:
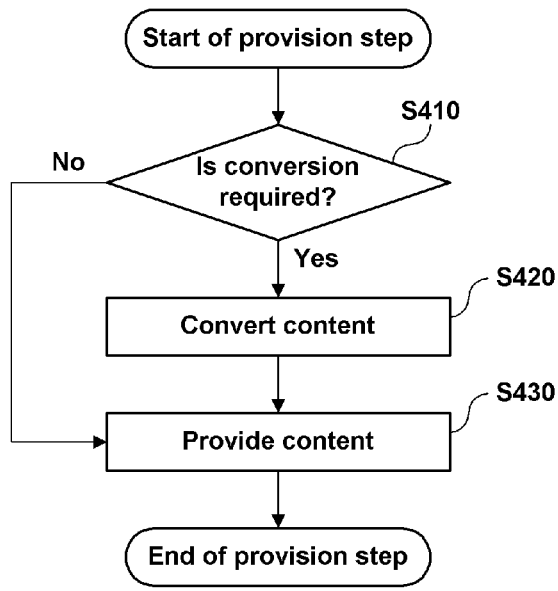
FIG. 10 is a detailed flowchart of the provision step shown in FIG. 6.

FIG. 6 is a flowchart of a content provision method according to an embodiment of the present invention. FIG. 7 is a detailed flowchart of the service request step shown in FIG. 6. FIG. 8 is a detailed flowchart of the authentication step shown in FIG. 6. FIG. 9 is a detailed flowchart of the content request step shown in FIG. 6. FIG. 10 is a detailed flowchart of the provision step shown in FIG. 6.

As shown in FIG. 6, the method of providing content to a plurality of end terminals according to the present embodiment is applied to a system in which the respective end terminals are connected to the mobile communication terminal via a LAN and a mobile communication terminal, a service server and an application server are interconnected via a mobile communication network. The content provision method includes a service request step S100, an authentication step S200, a content request step S300, and a provision step S400. That is, the content provision method according to the present embodiment relates to a method of providing content to some other end terminals, which are connected to the mobile communication terminal over the LAN, while the mobile communication terminal provides the content to one end terminal. Here, it should be noted that the content provision method according to the present embodiment may be applied to a technology for transferring data requested by a plurality of respective end terminals in a system in which the end terminals are interconnected. It should also be noted that the service request step S100, the authentication step S200, the content request step S300 and/or the provision step S400 may be performed at the same time depending on the times when the respective end terminals initiate their connections. In other words, at a specific time, a first end terminal may be in a state in which it has performed only the service request step S100 and the authentication step S200, and a second end terminal may be in a state in which it has performed the service request step S100, the authentication step S200 and the content request step S300.

The service request step S100 is a step at which each of the end terminals searches for the mobile communication terminal and transmits a service request signal to the located mobile communication terminal. The service request step S100 is described in detail with reference to FIG. 7. First, each end terminal searches for the mobile communication terminal over the LAN at step S110. Thereafter, each end terminal transmits a service request signal to the mobile communication terminal at step S120.

The authentication step S200 is the step at which the service server performs authentication for the provision of service on each end terminal and the mobile communication terminal. The authentication step S200 is described in detail with reference to FIG. 8. At a first authentication step S210, the mobile communication terminal checks the serviceability of each end terminal. Items checked at this step may include the hardware specification of each end terminal and registration in the authentication device of the service server.

At a second authentication step S220, if, as a result of the determination at the first authentication step, each end terminal is determined to be a serviceable device, the end terminal transmits unique ID information to the mobile communication terminal.

At a third authentication step S230, the mobile communication terminal determines whether the unique ID information of the end terminal is normal. Whether the unique ID information is normal is determined by checking whether the unique ID information complies with a format designated by the service server.

At a fourth authentication step S240, if, as a result of the determination at the third authentication step, the unique ID information is determined to be normal, the mobile communication terminal transmits the unique ID information of the mobile communication terminal and the unique ID information of each end terminal to the service server.

At a fifth authentication step S250, the service server determines whether the mobile communication terminal and each end terminal are in a serviceable state on the basis of the unique ID information and subscription information of the mobile communication terminal and end terminal. The serviceable state refers to a state in which the mobile communication terminal normally operates and the hardware specifications of the mobile communication terminal and end terminal have no problems with the performance of a service. Here, it is preferred that the hardware specifications of the mobile communication terminal and the end terminals be stored in the storage unit of the service server. Meanwhile, the above-described subscription information is used to check whether a subscriber has subscribed to a rate system that is available for the service.

At a fifth authentication step S260, if, as a result of the determination at the fifth authentication step, the mobile communication terminal and each end terminal are determined to be in a serviceable state, the service server transmits an authentication message to each end terminal. The authentication message is transmitted to each end terminal through the mobile communication terminal.

The content request step S300 is the step at which each end terminal selects content from a list provided by the service server and requests the service server to transmit the selected content. The content request step S300 is described in detail with reference to FIG. 9. At a first content request step S310, each end terminal transmits information about a connected LAN and a list request message to the service server. The LAN information includes information about the type of LAN.

At a second content request step S320, the service server transmits the requested list to each end terminal. Here, the provided list may include information about the storage of content and billing information.

At a third content request step S330, the service server transmits content information included in the requested list to each end terminal.

At a fourth content request step S340, each end terminal selects content included in the list, and transmits the selected content to the service server. In this case, each end terminal may further perform an operation of transmitting payment information to the billing server. The payment information includes mobile communication terminal payment information and prepayment information.

The provision step S400 is the step at which the application server provides the content requested by each end terminal.

The provision step S400 is described in detail with reference to FIG. 10. At a first provision step S410, the service server determines whether conversion of the selected content is required. Conversion of the content is required when conversion of the data structure or the like of content is required for the execution of the content in each end terminal and/or the mobile communication terminal. In this case, the service server determines whether to convert the content so that the content can be executed under the specification of each end terminal or the mobile communication terminal.

At a second provision step S420, if, as a result of the determination at the first provision step, conversion of the selected content is determined to be required, the service server requests the application server to convert the content or the service server directly converts the content. At a third provision step S430, the service server transmits the converted content to each end terminal. That is, the converted content is transmitted from the application server to each end terminal via the service server and the mobile communication terminal. After the content has been transmitted, the service server notifies the billing server of transmission of the content. In response to this, the billing server further stores billing information generated for the mobile communication terminal.

A service server for relaying content to a plurality of end terminals according to an embodiment of the present invention and a relay method using the same are described below with reference to FIGS. 2 and 11.

Figure 2:
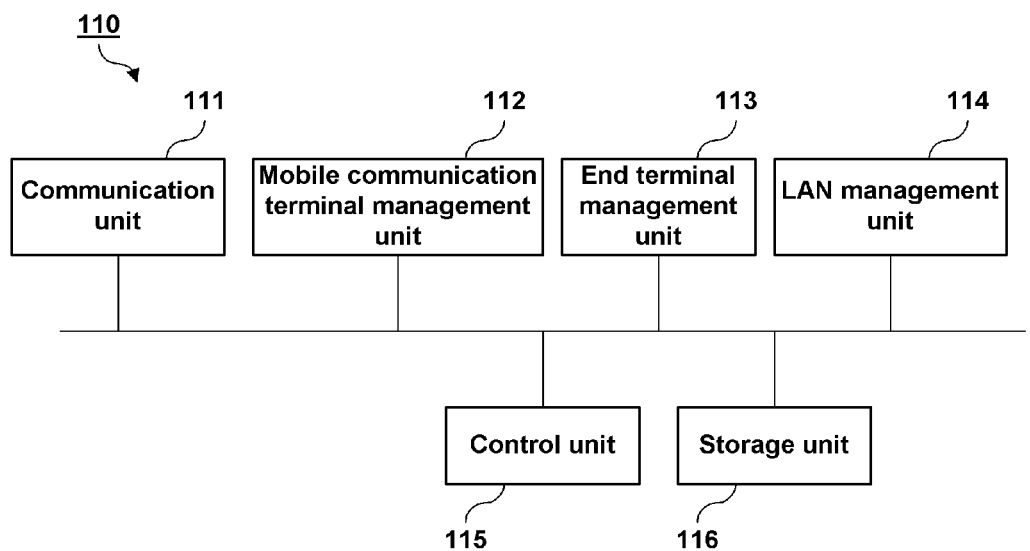
FIG. 2 is a detailed block diagram of the service server shown in FIG. 1.
Figure 11:
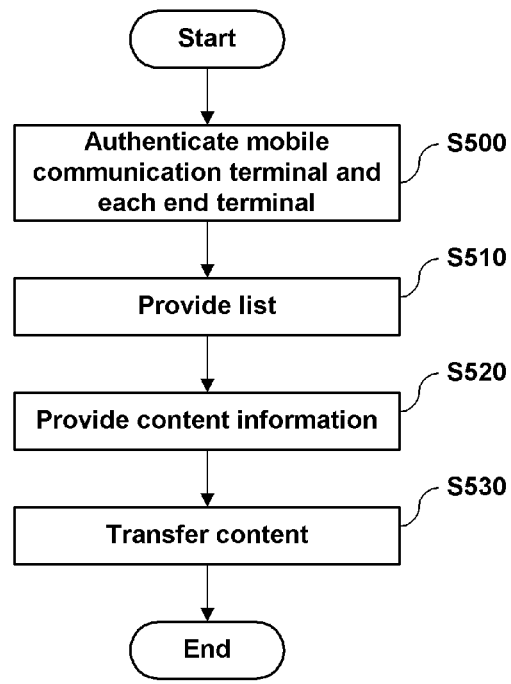
FIG. 11 is a flowchart of a method of relaying content through a service server according to an embodiment of the present invention.

FIG. 2 is a detailed block diagram of the service server shown in FIG. 1, and FIG. 11 is a flowchart of a method of relaying content through the service server according to an embodiment of the present invention.

Referring to FIG. 2, in the service server 110 for relaying content to a plurality of end terminals (hereinafter, the 'service server for relaying content to a plurality of end terminals' is simply referred to as the 'service server' unless described otherwise, for convenience of description), a communication unit 111 transmits and receives data over a mobile communication network.

A mobile communication terminal management unit 112 manages mobile communication terminal information that is received through the communication unit 111. The managed mobile communication terminal information may include the type, hardware specification and user information of the mobile communication terminal.

An end terminal management unit 113 manages end terminal information that is received through the communication unit 111. The managed end terminal information may include the types, hardware specifications and unique accounts of the end terminals.

A LAN management unit 114 manages information of a LAN that relays communication between the mobile communication terminal and the end terminals. The managed LAN information may include the standard of a communication network and login account information when login is necessary.

A storage unit 116 stores the mobile communication terminal information, the end terminal information, and the LAN information.

A control unit 115 controls the operation of the respective elements, authenticates the mobile communication terminal and respective end terminals based on the mobile communication terminal information and the end terminal information, and controls the communication unit 111 so that it transfers content, received from the application server, to the mobile communication terminal.

The method of relaying content through the service server is described below with reference to FIG. 11.

At a first step S500, the service server authenticates the mobile communication terminal and the respective end terminals.

At a second step S510, content lists are provided to the mobile communication terminal. Here, it should be noted that the number of content lists corresponds to the number of end terminals.

At a third step S520, content information is provided to the mobile communication terminal. Here, it should be noted that the number of the content information corresponds to the number of end terminals.

At a fourth step S530, content requested by the mobile communication terminal is received from the application server and is then transmitted to the mobile communication terminal. Here, it should be noted that the service server may transfer a content conversion request based on the hardware specification of the mobile communication terminal or the hardware specifications of the end terminals to the application server or may directly convert the content conversion request, and may transfer content, which has been converted in the application server or has been directly converted by the service server, to the mobile communication terminal.

Meanwhile, the above-described method of relaying content is stored in a storage medium in the form of a program.

Figure 13:
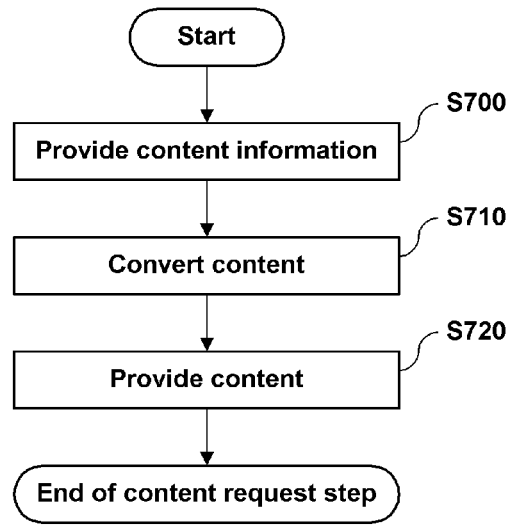
FIG. 13 is a flowchart of a method of providing content through an application server according to an embodiment of the present invention.

The application server for providing content and the method of providing content through the same according to an embodiment of the present invention are described below with reference to FIGS. 3 and 13.

Figure 3:
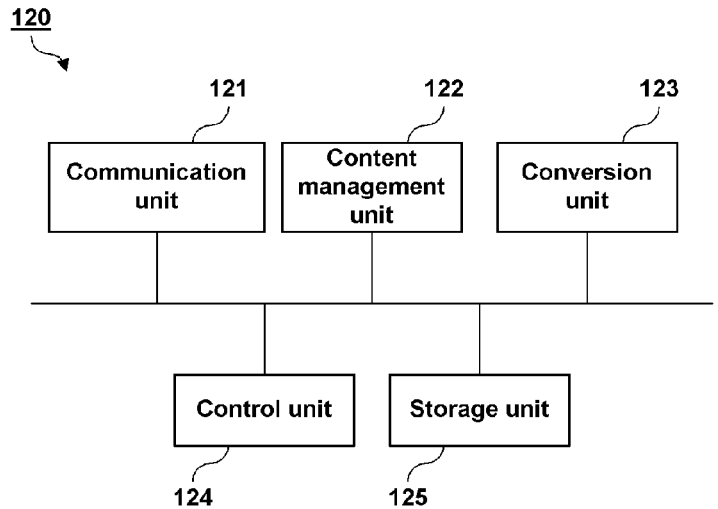
FIG. 3 is a detailed block diagram of the application server shown in FIG. 1.

FIG. 3 is a detailed block diagram of the application server shown in FIG. 1. FIG. 13 is a flowchart of the method of providing content through the application server according to an embodiment of the present invention.

First, referring to FIG. 3, in the application server for providing content 120 (hereinafter the 'application server for providing content' is simply referred to as the 'application server' unless described otherwise, for convenience of description), a communication unit 121 transmits and receives data over a mobile communication network.

A content management unit 122 manages content. The items of the managed content may include a content description, the type of LAN that can transmit content, billing information, the size of content, a content data structure, and a content transmission format.

A conversion unit 123 converts content according to a content conversion command generated by a control unit 124.

The control unit 124 controls the operation of the respective elements, and controls the communication unit 121 so that it provides content information to the service server. When a content conversion request is received from the service server, the control unit 124 controls the conversion unit 123 so that it converts content, and controls the communication unit 121 so that it provides the content to the service server.

The storage unit 125 stores content.

The content provision method is described below with reference to FIG. 13. At a first step S700, content information is provided to the service server.

At a second step S710, the content is converted at the request of the service server.

At a third step S720, the content requested by the service server is provided to the service server.

Meanwhile, the content provision method is stored in a storage medium in the form of a program.

Figure 12:
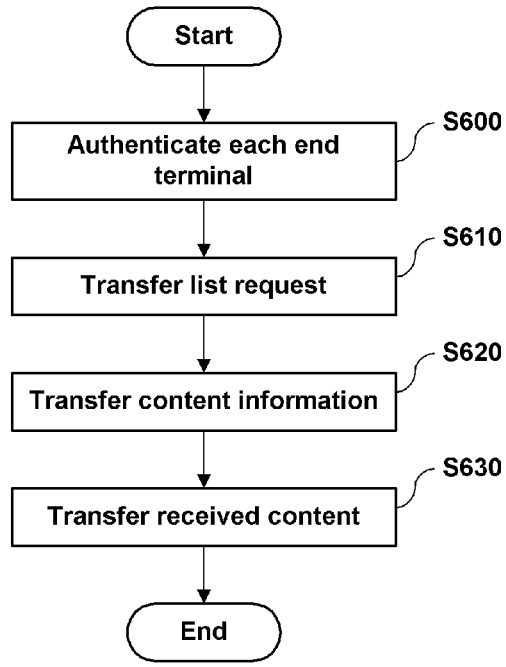
FIG. 12 is a flowchart of a method of relaying content through a mobile communication terminal according to an embodiment of the present invention.

The mobile communication terminal for relaying content and the method of relaying content through the same according to an embodiment of the present invention are described below with reference to FIGS. 4 and 12.

Figure 4:
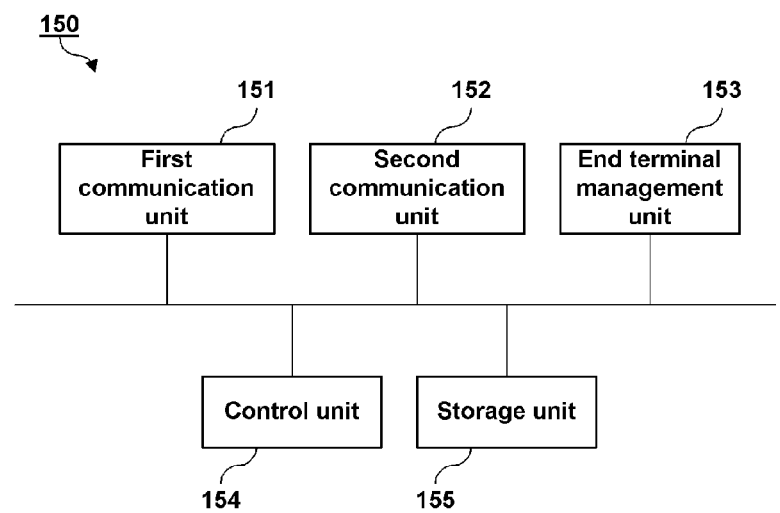
FIG. 4 is a detailed block diagram of the mobile communication terminal shown in FIG. 1.

FIG. 4 is a detailed block diagram of the mobile communication terminal shown in FIG. 1. FIG. 12 is a flowchart of a method of relaying content through the mobile communication terminal according to an embodiment of the present invention.

First, referring to FIG. 4, in the mobile communication terminal 150 for relaying content (hereinafter 'the mobile communication terminal for relaying content' is simply referred to as 'the mobile communication terminal' unless described otherwise, for convenience of description), a first communication unit 151 transmits and receives data over a mobile communication network.

A second communication unit 152 transmits or receives data over a LAN. In order to comply with various types of LANs, the second communication unit 152 may comply with two or more LAN communication standards. Furthermore, it should be noted that the second communication unit 152 performs communication different from that of each end terminal.

An end terminal management unit 153 manages respective pieces of end terminal information that are received through the second communication unit 152.

A storage unit 155 stores the end terminal information. The storage unit 155 may store the content that is received from the service server when necessary. Since the received content is stored in the storage unit 155, the mobile communication terminal 150 can also execute the received content. In the case where the transmission of content to the end terminals is not completed due to a problem in communication, part of the content that has not been transmitted can be transmitted when a communication path is normalized.

A control unit 154 controls the operation of the respective elements. In particular, the control unit 154 checks the serviceability of the end terminals and the normality of the unique ID information of the end terminals, and controls the first communication unit and the second communication unit so that content requests made by end terminals are transferred to the service server and content received from the service server is transferred to end terminals.

The relay method is described below with reference to FIG. 12. At a first step S600, the respective end terminals are authenticated.

At a second step S610, requests for content lists are transferred to the service server. Here, it should be noted that the number of content lists corresponds to the number of end terminals.

At a third step S620, the content lists received from the service server are transferred to the end terminals.

At a fourth step S630, the content received from the service server is transferred to the end terminals. Here, it should be noted that the received content may be stored for buffering in the storage unit or for execution. Furthermore, an execution step of storing and executing the content received from the service server may be further performed. Here, it should be noted that the number of pieces of received content corresponds to the number of end terminals that are connected via a LAN.

Meanwhile, there lay method may be stored in the storage medium in the form of a program.

The embodiments of the present invention have been described with reference to the accompanying drawings.

However, it should be noted that the present invention is not specially limited only to the above-described embodiments and those skilled in the art may make various modifications and changes within the scope and spirit of the accompanying claims when necessary.

The invention claimed is:

1. A system for providing content to a plurality of end terminals, the system comprising:
    the plurality of end terminals connected to a mobile communication terminal via a Local Area Network (LAN), and configured to execute content received from an application server;
    a mobile communication terminal connected to a service server via a mobile communication network, and configured to transfer content between the end terminals and the service server;
    the service server connected to the application server via the mobile communication network or a wired communication network, and configured to authenticate the end terminals and the mobile communication terminal and to request content, requested by authenticated end terminals, from the application server; and
    the application server for providing the content, requested by the end terminals, to the service server.

2. The system according to claim 1, further comprising:
    a billing server connected to the service server via the mobile communication network or the wired communication network, and configured to charge the mobile communication terminal in the case where content is provided by the application server to the end terminals.

3. A service server for relaying content to a plurality of end terminals, the service server comprising:
    a communication unit configured to transmit and receiving data over a mobile communication network;
    a mobile communication terminal management unit configured to manage mobile communication terminal information received through the communication unit
    an end terminal management unit configured to manage end terminal information received through the communication unit;
    a LAN management unit configured to manage information about a LAN between the mobile communication terminal and the end terminals a storage unit configured to store the mobile communication terminal information, the end terminal information, and the LAN information and a control unit configured to authenticate the mobile communication terminal and the end terminals based on the mobile communication terminal information and the end terminal information and controlling content, received from the communication unit, so that it will be transferred to the mobile communication terminal.

4. A mobile communication terminal for relaying content, comprising:
    a first communication unit for transmitting and receiving data over a mobile communication network;
    a second communication unit for transmitting and receiving data over a LAN an end terminal management unit for managing respective pieces of end terminal information received through the second communication unit;
    a storage unit for storing the end terminal information and a control unit for checking serviceability of the end terminals and normality of unique ID information of the end terminals, and controlling the first communication unit and the second communication unit so that content requests made by the end terminals are transferred to a service server and content received from the service server is transferred to the end terminals.

5. A method of providing content to a plurality of end terminals using a system in which the end terminals and a mobile communication terminal are interconnected via a LAN and the mobile communication terminal, a service server and an application server are interconnected via a mobile communication network, the content provision method comprising:

an authentication step of the service server authenticating the end terminals and the mobile communication terminal;

a content request step of each of the end terminals selecting content from a list provided by the service server and requesting the service server to transmit the selected content and a provision step of the application server providing the content, requested by the end terminal, to the end terminal.

6. The method according to claim 5, further comprising a service request step of each of the end terminals searching for a mobile communication terminal and transmitting a service request signal to the located mobile communication terminal.

7. The method according to claim 5, wherein the authentication step comprises:

a first authentication step of the mobile communication terminal determining whether each of the end terminals is a serviceable device a second authentication step of, if, as a result of the determination at the first authentication step, the end terminal is determined to be a serviceable device, the end terminal transmitting unique ID information thereof to the mobile communication terminal;

a third authentication step of the mobile communication terminal determining whether the unique ID information of the end terminal is normal a fourth authentication step of, if, as a result of the determination at the third authentication step, the unique ID information is determined to be normal, the mobile communication terminal transmitting unique ID information of the mobile communication terminal and the end terminal to the service server;

a fifth authentication step of the service server determining serviceability of the mobile communication terminal and the end terminal based on unique ID information and subscription information of the mobile communication terminal and the end terminal and a sixth authentication step of, if, as a result of the determination at the fifth authentication step, the mobile communication terminal and the end terminal are determined to have serviceability, transmitting an authentication message to the end terminal.

8. The method according to claim 5, wherein the content request step comprises:

a first content request step of each of the end terminals transmitting information about a connected LAN and a list request message to the service server;

a second content request step of the service server transmitting the requested list to the end terminal a third content request step of the service server transmitting content information, included in the requested list, to the end terminal and a fourth content request step of the end terminal selecting content information, included in the list, and transmitting the selected content information to the service server.

9. The method according to claim 8, wherein the content information of the third content request step comprises a content description, a type of LAN through which the content information can be transmitted, billing information, a size of the content, and a codec and transmission format of the content.

10. The method according to claim 8, wherein the fourth content request step further comprises a step of the end terminal transmitting billing information to a billing server.

11. The method according to claim 5, wherein the provision step comprises:

a first provision step of the service server determining whether conversion of the selected content is required;

a second provision step of, if as a result of the determination at the first provision step, conversion is determined to be required, the service server requesting the application server to convert the selected content or the service server directly converting the content; and a third provision step of the service server transmitting the converted content to the end terminal.

12. A method of relaying content to respective end terminals using a service server, the method comprising:

an authentication step of authenticating a mobile communication terminal and the respective end terminals a list provision step of providing a content list to the mobile communication terminal;

a content information provision step of providing content information to the mobile communication terminal; and a content transfer step of receiving content, requested by the mobile communication terminal, from an application server and transmitting the received content to the mobile communication terminal.

13. The method according to claim 12, wherein the content transfer step comprises the service server transferring a content conversion request based on a hardware specification of the mobile communication terminal or each of the respective end terminals to the service server or directly converting the content, and transferring content, converted in the application server or directly converted by the service server, to the mobile communication terminal.

14. A non-transitory computer-readable medium storing the method of relaying content to a plurality of end terminals using a service server according to claim 12 in program form.

* * * * *